(12) United States Patent
Knutsen

(10) Patent No.: US 7,750,255 B2
(45) Date of Patent: Jul. 6, 2010

(54) HYDRAULIC WEIGHT-MEASURING APPARATUS AND METHOD

(76) Inventor: Hans Knutsen, Arboldveien 22, Akrehamn (NO) 4270

( * ) Notice: Subject to any disclaimer, the term of this patent is extended or adjusted under 35 U.S.C. 154(b) by 101 days.

(21) Appl. No.: 12/090,095

(22) PCT Filed: Sep. 25, 2006

(86) PCT No.: PCT/NO2006/000331

§ 371 (c)(1),
(2), (4) Date: Apr. 14, 2008

(87) PCT Pub. No.: WO2007/049967

PCT Pub. Date: May 3, 2007

(65) Prior Publication Data

US 2008/0271932 A1    Nov. 6, 2008

(30) Foreign Application Priority Data

Oct. 27, 2005    (NO) .................................. 20055021

(51) Int. Cl.
G01G 19/00    (2006.01)
B66F 11/00    (2006.01)

(52) U.S. Cl. .................. 177/141; 177/146; 177/208; 177/254; 254/1

(58) Field of Classification Search .............. 177/141, 177/146, 208, 209, 254; 254/1
See application file for complete search history.

(56) References Cited

U.S. PATENT DOCUMENTS 3,866,464 A * 2/1975 Franklin ............... 73/862.584
4,306,629 A * 12/1981 Powell ........................ 177/1
4,383,584 A * 5/1983 Dyck ........................ 177/208
4,583,606 A * 4/1986 Menon ...................... 177/208

(Continued)

FOREIGN PATENT DOCUMENTS

DE    3915093    9/1990

(Continued)

OTHER PUBLICATIONS

Anonymous, "The Power Jack", Internet article, [online] 2001, http://www.membrantech.com/en_default, retreived on Dec. 4, 2006.

*Primary Examiner*—Randy W Gibson
(74) *Attorney, Agent, or Firm*—Christian D. Abel

(57) ABSTRACT

The present invention relates to a system and a method for weighing a section of a structure (1). The system comprises at least one hydraulic weight sensor device (3), adapted to be placed in at least one slot (2) under the section, a pressure sensor (7) for measuring the pressure in the at least one weight sensor device (3), and a hydraulic system comprising at least one pump unit (5) and at least one valve unit (6) for pumping hydraulic fluid to and from the at least one hydraulic weight sensor device (3) through a hydraulic line (4). The system further comprises a distance sensor (10) for measuring the height of the slot (2), a control circuit device (20) for calculating the weight of the section based on measured data received from the pressure sensor (7), and for balancing the section on the basis of the measured data received from the pressure sensor (7) and the distance sensor (10) by controlling the pump unit (5) and the valve unit (6).

6 Claims, 1 Drawing Sheet

U.S. PATENT DOCUMENTS

Figure 1:
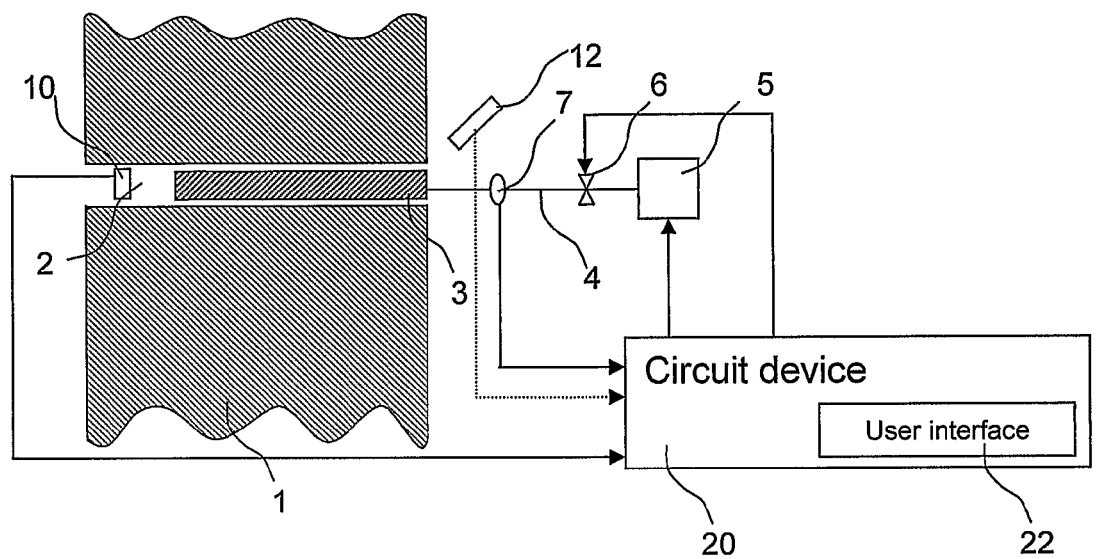

| | | | | |
|---|---|---|---|---|
| 4,651,838 | A | * | 3/1987 | Hamilton et al. ............ 177/209 |
| 4,716,979 | A | * | 1/1988 | Bradley et al. .............. 177/208 |
| 4,832,141 | A | * | 5/1989 | Perini et al. ................. 177/141 |
| 4,852,674 | A | * | 8/1989 | Gudat ......................... 177/141 |
| 4,903,946 | A | * | 2/1990 | Stark ........................... 254/45 |
| 5,521,827 | A | * | 5/1996 | Lindberg et al. ............ 701/124 |
| 5,595,405 | A | * | 1/1997 | Knutsen ....................... 285/96 |
| 5,610,372 | A | * | 3/1997 | Phillips et al. ........... 177/25.14 |
| 5,819,389 | A | | 10/1998 | Knutsen |
| 6,089,106 | A | * | 7/2000 | Patel et al. ............. 73/862.582 |
| 6,601,013 | B2 | * | 7/2003 | Lueschow et al. ........... 702/175 |
| 6,756,547 | B2 | * | 6/2004 | Lefler ......................... 177/141 |
| 7,544,902 | B2 | * | 6/2009 | Stanford ..................... 177/146 |
| 2009/0234504 | A1 | * | 9/2009 | Mikowski et al. ........... 700/275 |

FOREIGN PATENT DOCUMENTS

| | | |
|---|---|---|
| FR | 2691252 | 11/1993 |
| GB | 1349988 | 4/1974 |

\* cited by examiner

HYDRAULIC WEIGHT-MEASURING APPARATUS AND METHOD

TECHNICAL FIELD

The present invention relates to a method and a system for weighing. More specifically, the present invention relates to the weighing of heavy structures such as offshore structures and modules, ship sections, buildings etc.

PRIOR ART

The dismantling of large and heavy structures, as for instance offshore oil platforms, is done by cutting the concrete/steel up into smaller sections typically by using a diamond wire. Each individual section is then lifted away from the structure and onto a transport vessel or the like by means of a lifting apparatus.

The weight of the individual sections of the structure can sometimes be calculated from the construction drawings, but very often structural changes have been made to the structure, which mean that the drawings are no longer correct. Thus, it becomes an impossible task to calculate the weight of the sections. For reasons of safety, there is a need, and sometimes it is also a requirement, to know the weight of the individual section before the lift is carried out.

Another problem in connection with the cutting up of large structures is that it may be a complex task to verify that the section has been completely separated from the rest of the structure.

Today, the weighing of such sections is done utilising hydraulic weighing cells or cylinders which require a great deal of space and opening (i.e., height) in order to be capable of being used. They are also extremely heavy, so lifting apparatus will usually be required in order to position them in the right place. If such weighing cells are to be used in connection with the dismantling of offshore steel/concrete structures, there will be extensive additional work cutting "openings" or spaces for the weighing cells. Reinforcements of the structure would probably also be required because of excessive point loading at the weighing cells, in particular in the case of concrete material.

GB 1349988 shows a device for measuring the wheel load of vehicles such as railway vehicles. The device is transportable and has a hydraulic system with a pump which pumps hydraulic fluid into a hydraulically operated jack in order to lift the vehicle up from the ground.

One of the objects of the present invention is to provide a method and a system for weighing such structures, where each individual section can be weighed in a relatively simple and accurate manner. It is also an object to verify that a section has in fact been separated from the rest of the structure.

The present invention is based on principles relating to diaphragm-based power jacks, for example, as taught in U.S. Pat. No. 5,819,389. This document is thus incorporated herein by reference in its entirety.

SUMMARY OF THE INVENTION

The present invention relates to a system for weighing a section, comprising:
  at least one hydraulic weight sensor device, adapted to be placed in at least one slot under the section, wherein the section can be raised and lowered by pumping hydraulic fluid respectively to and from the weight sensor device;
  a pressure sensor for measuring the pressure in the at least one weight sensor device;
  a hydraulic system comprising at least one pump unit and at least one valve unit for pumping hydraulic fluid to and from the at least one hydraulic weight sensor device through a hydraulic line.

The system is characterised in that it further comprises:
  a distance sensor for measuring the height of the slot;
  a control circuit device for calculating the weight of the section based on measured data received from the pressure sensor, and for maintaining the position of the section by pumping hydraulic fluid to and from the at least one hydraulic weight sensor device by controlling the pump unit and the valve unit on the basis of the measured data received from the distance sensor.

The present invention also relates to a method for weighing a section, wherein the method comprises the following steps:
  placing at least one hydraulic weight sensor device in at least one slot under the section, wherein the section can be raised and lowered by pumping hydraulic fluid respectively to and from the weight sensor device;
  measuring the pressure in the at least one weight sensor device using a pressure sensor;
  measuring the height of the slot using a distance sensor;
  maintaining the position of the section by pumping hydraulic fluid to and from the at least one hydraulic weight sensor device on the basis of measured data received from the distance sensor;
  calculating the weight of the section using a control circuit device.

Preferred embodiments of the invention are set forth in the dependent claims.

DETAILED DESCRIPTION

Figure 2:
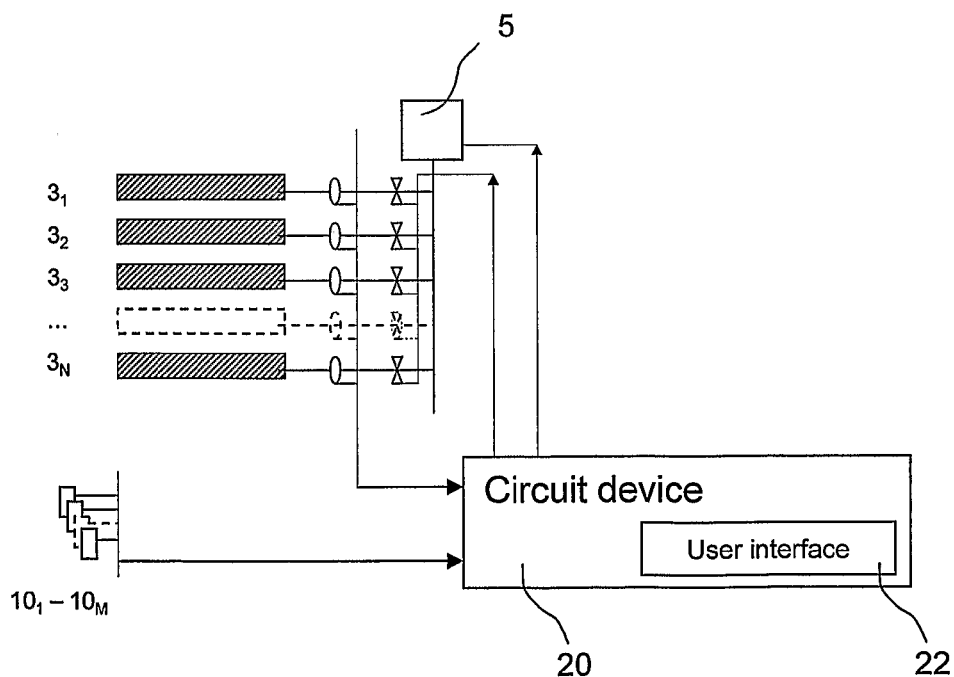

Preferred embodiments of the present invention will now be described in detail with reference to the attached drawings, wherein:

FIG. 1 illustrates the system in accordance with a simple embodiment of the invention, with one weight sensor device positioned in a structure; and FIG. 2 is a schematic illustration of the system in accordance with a second and larger embodiment, where multiple weight sensor devices are used.

Reference is now made to FIGS. 1 and 2 which show the preferred embodiment in accordance with the invention.

A structure 1 is cut typically into two sections using a diamond wire or another cutting tool (not shown). This cutting operation leaves a slot 2 of typically about 10 mm. The system in accordance with the preferred embodiment comprises a weight sensor device 3, which is placed in the slot 2 in an unexpanded state. Preferably, the weight sensor device 3 is inserted into the slot 2 immediately after the cutting tool, and can then expand slightly as required, as will be apparent from the description below. In this way, the upper section of the structure is supported, thereby maintaining the height of the slot 2, and consequently also securing the structure against collapse, and the cutting tool is also prevented from becoming stuck between the sections during the cutting operation.

Alternatively, it is of course possible to insert spacers or wedges between the sections during and after the cutting operation, and then insert the weight sensor device 3 in a subsequent separate operation. After the weight sensor device 3 has been put in place, the wedges will be removed so that the section rests on the weight sensor device 3.

The weight sensor device 3 corresponds basically to the diaphragm power jack as described in U.S. Pat. No. 5,819,389, which is incorporated herein by reference. The diaphragm power jack 3 will not be described in detail here, but essentially comprises two opposing thin metal plates which are sealingly joined along their periphery. The diaphragm power jack 3 further comprises a pipe or line 4 for the supply of hydraulic fluid to the space between the metal plates. The supply of hydraulic fluid at high pressure to the space between the metal plates will allow very heavy structures to be lifted a short distance.

It should be noted that the diaphragm power jack is so low that it will be capable of being placed in the slot 2. Furthermore, it has a relatively large surface, which means that point loading, for example, of concrete, will not be a problem. It can be mentioned that a typical size of the weight sensor device 3 may be 500 mm×600 mm, and it has an unexpanded height of typically 4-6 mm, although this should not be interpreted as being limiting for the present invention.

The system further comprises a hydraulic pump unit 5 for pumping hydraulic fluid to the weight sensor device 3 via the hydraulic line 4. In the hydraulic line 4 there are also provided a valve unit 6 for opening/closing the connection between the pump unit 5 and the weight sensor device 3, and a pressure sensor 7 for measuring the hydraulic pressure in the weight sensor device 3. The pump unit 5 is preferably connected to a tank (not shown) for hydraulic fluid. The hydraulic fluid in the preferred embodiment may be (fresh) water, hydraulic oil or other suitable hydraulic fluid.

The system preferably also comprises a distance sensor 10, for example, an optical distance meter, for measuring the height of the slot 2, and a monitoring device 12, as for instance a surveillance camera or the like.

The pressure sensor 7 and the distance sensor 10 are connected to a control circuit device 20, for recording the pressure in the weight sensor device 3 and the height of the slot 2. The control circuit device 20 may be a computer or a data processing and storage unit, which processes and, if desirable, stores the data during the operation. The control circuit device 20 also comprises a user interface 22, for example comprising screen, keyboard, pointing device or the like, so as to enable an operator to monitor and optionally control the weighing operation manually. The control circuit device 20 is also connected to the pump unit 5 and the valve unit 6, for controlling the respective functions thereof.

Preferably, the monitoring unit 12 is also connected to the control circuit device 12, so that images or image sequences from the operation can be displayed and stored. Alternatively, the monitoring unit 12 is connected to a separate screen for manual monitoring.

After or concurrently with the positioning of the weight sensor device 3 in the slot 2, the weight sensor device 3 is supplied preferably with hydraulic fluid. This is done in that the valve unit 6 is opened and the pump unit 5 pumps hydraulic fluid to the weight sensor device. The pressure in the weight sensor device 3 is increased so that the upper section of the structure 1 does not fall down onto the bottom section of the structure 1. The distance sensor 10 is used to monitor the distance between the sections. If the distance sensor 10 detects an increase in the distance between the sections, the control circuit device 20 ensures that the amount of fluid in the weight sensor device 3 is decreased, but if the distance sensor 10 detects a decrease in the distance between the sections, the control circuit device 20 ensures that the amount of fluid in the weight sensor device 3 is increased. The purpose of this fluid compensation or balancing is to ensure that the structure remains immobile during the cutting operation. The weight sensor device 3 also has an upper limit for how high it can expand, and balancing thus ensures that this is not exceeded.

We will now refer to FIG. 2, which shows a system in accordance with the invention comprising multiple weight sensor devices 3.

When the present invention is to be used on larger structures, the system will of course comprise a number N of weight sensor devices 3 with hydraulic lines 4 and valve units 6. The hydraulic system will preferably comprise fewer than N pump units 5, since one pump unit 5 will be able to supply several weight sensor devices 3 by means of manifolds, hydraulic lines, valve stations etc. The system in accordance with the invention further comprises a number M of distance sensors 10 and several monitoring devices 12 (not shown in FIG. 2).

In such a system, the various elements will, for example, be connected to the control circuit device 20 through a data bus for transfer of measured data and control data.

It should be noted that the system in accordance with the invention, i.e., the number and position of the different sensors, the design of the hydraulic system, the connection to and the function of the control circuit device 20, will be determined on the basis of technical/financial assessments relating to the actual section that is to be weighed, for example, its location offshore/onshore, safety regulations, whether the weighing operation is to be carried out during or after the cutting operation etc.

During the weighing of the section using the system in FIG. 2, the weight will of course be determined on the basis of pressure measurements from several weight sensor devices 3/pressure sensors 4 in order to find the total weight. The system will also be highly suitable for calculating the centre of gravity (COG) of the section—which is extremely important if the section is to be removed using a crane.

It should also be noted that all sensors in the system in accordance with the invention are calibrated according to current industrial standards for their respective measuring characteristics. The weight sensor device 3 is specifically calibrated in relation to weight/area/pressure. This is considered to be a familiar operation for the skilled person in the field.

Verification

A further advantage of the present invention is that the system is capable of verifying whether the section in question has been separated from the rest of the structure, which is a relevant problem area in connection with the splitting up of large and complex structures where a plurality of weight sensor devices 3 are used. This can be accomplished in the following manner.

After the separation of the section is assumed to have been completed, the plurality of weight sensor devices 3 are supplied with more hydraulic fluid. It is therefore the power jack function of the weight sensor device 3 that is utilised. It should be noted that the lifting height here does not need to be great, but that the lifting takes place relatively simultaneously at several weight sensor devices 3.

On lifting the section, that is to say increasing the pressure supplied to the weight sensor devices 3, it is expected that a simultaneous increase in the height of the slot 2 will take place, this last-mentioned being measured by the distance sensor 10. If there is no simultaneous increase in the height of the slot 2 at a determined (predetermined) pressure increase, or if there is an increase in the height of the slot 2 proximate to some weight sensor devices 3, whilst there is no increase in the height of the slot 2 proximate to other weight sensor devices 3, this will be an indication that the section is still attached to the rest of the structure.

It should be noted that the method above will vary with the section that is to be lifted and the positioning of the weight sensor devices 3. If the COG coincides with the centre of the section and each weight sensor device 3 carries approximately the same weight, the pressure could be increased simultaneously in all the weight sensor devices 3. However, if the COG is close to the periphery of the section, the pressure in the respective weight sensor devices 3 must be increased individually (by closing/opening valve devices 6), thereby adapting the pressure to the calculated weight of the section that the respective weight sensor devices 3 carry.

When splitting up simple structures, it will of course be possible to carry out such verification by manual inspection.

The present invention can be varied within the scope of the attached claims. As mentioned above, the number of elements and system configuration will be dependent upon the individual structure. Thus, there could be several weight sensor devices 3 and several distance sensors 10 in one and the same slot 2.

It should also be noted that it may be appropriate to incorporate weight sensor devices 3 into or under a structure already at the time of its construction.

It should further be noted that the description above has been given with the aid of an example wherein the weight sensor device 3 is placed in a slot 2, the slot 2 being made by cutting through the structure. Of course, the invention is not intended to be dependent upon cutting operations; it will be of no importance how the weight sensor device is placed under the section, as long as it is capable of bearing the weight of the section.

If it is a question of weighing quite small structures, it will of course be possible to do so by weighing the whole structure in one and the same operation.

Further modifications and variations will be obvious to a person of skill in the art in the light of the above description. The scope of the invention results from the claims below and their equivalents.

The invention claimed is:

1. A system for weighing a section, comprising:
    at least one hydraulic weight sensor device, adapted to be placed in at least one slot under the section, wherein the section can be raised and lowered by pumping hydraulic fluid respectively to and from the weight sensor device, wherein the at least one hydraulic weight sensor device is a diaphragm-based power jack comprising two opposing metal plates which are sealingly joined along their periphery and a pipe for the supply of hydraulic fluid to the space between the metal plates;
    a pressure sensor for measuring the pressure in the at least one weight sensor device;
    a hydraulic system comprising at least one pump unit and at least one valve unit for pumping hydraulic fluid to and from the at least one hydraulic weight sensor device through a hydraulic line, wherein the system further comprises:
    a distance sensor for measuring the height of the slot;
    a control circuit device for calculating the weight of the section based on measured data received from the pressure sensor, and for maintaining the position of the section by pumping hydraulic fluid to and from the at least one hydraulic weight sensor device by controlling the pump unit and the valve unit on the basis of the measured data received from the distance sensor.

2. A system in accordance with claim 1, wherein the control circuit device in addition comprises a user interface for manual monitoring and/or control of the system.

3. A system in accordance with claim 1, wherein the system further comprises at least one monitoring device.

4. A method for weighing a section, wherein it comprises the following steps:
    placing at least one hydraulic weight sensor device in at least one slot under the section, wherein the section can be raised and lowered by pumping hydraulic fluid respectively to and from the weight sensor device, wherein the at least one hydraulic weight sensor device is a diaphragm-based power jack comprising two opposing metal plates which are sealingly joined along their periphery and a pipe for the supply of hydraulic fluid to the space between the metal plates;
    measuring the pressure in the at least one weight sensor device using a pressure sensor;
    measuring the height of the slot using a distance sensor;
    maintaining the position of the section by pumping hydraulic fluid to and from the at least one hydraulic weight sensor device on the basis of measured data received from the distance sensor;
    calculating the weight of the section using a control circuit device.

5. A method in accordance with claim 4, wherein the control circuit device in addition comprises a user interface for manual monitoring and/or control of the system.

6. A method in accordance with claim 4, wherein it comprises monitoring the weighing operation using at least one monitoring device.

* * * * *